(12) United States Patent
VanderLeest

(10) Patent No.: US 6,347,289 B1
(45) Date of Patent: Feb. 12, 2002

(54) METHOD AND APPARATUS FOR DETERMINING AN IN-RANGE FAILURE OF A SPEED SENSOR

(75) Inventor: Ruurd Edward VanderLeest, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/124,213

(22) Filed: Jul. 28, 1998

(51) Int. Cl.$^7$ .......................................... G01M 17/013
(52) U.S. Cl. ...................................... 702/115; 73/7.41
(58) Field of Search .................... 702/33–35, 58–59, 702/79, 96, 116, 104, 142, 145–149, 178, 182–185, 189, 188, FOR 103, FOR 113, FOR 123–126, FOR 130, FOR 134–135, FOR 150–151, FOR 154, FOR 170–171; 700/290, 289; 73/1.41; 324/513, 160–163, 178; 701/63; 310/323.21

(56) References Cited

U.S. PATENT DOCUMENTS

| | | | | |
|---|---|---|---|---|
| 4,564,916 A | * | 1/1986 | Hori et al. ................... | 354/551 |
| 4,853,858 A | * | 8/1989 | Kumura .................... | 364/424.1 |
| 5,020,008 A | * | 5/1991 | Chambers et al. .......... | 364/561 |
| 5,126,942 A | * | 6/1992 | Matsuda et al. ........ | 364/426.02 |
| 5,357,181 A | * | 10/1994 | Mutoh et al. ............... | 318/139 |
| 5,377,127 A | * | 12/1994 | Gibson et al. .............. | 364/571 |
| 5,400,268 A | * | 3/1995 | Katsuda et al. ............. | 364/565 |
| 5,406,485 A | * | 4/1995 | Wise et al. ............ | 364/426.02 |
| 5,636,145 A | * | 6/1997 | Gorman et al. ........... | 364/565 |
| 5,923,163 A | * | 7/1999 | Stuible et al. .............. | 324/160 |
| 6,073,262 A | * | 1/2000 | Larkin et al. ............... | 714/736 |

* cited by examiner

*Primary Examiner*—Marc S. Hoff
*Assistant Examiner*—Edward Raymond

(57) ABSTRACT

A method and an apparatus for determining the existence of an in-range failure of a speed sensor involves sensing the speed of a moving device at three consecutive instances in time, wherein the time intervals between these instances in time are preferably equally spaced, and wherein each time interval is relatively short in duration to thereby correlate in time to the waveform characteristics of most anticipated in-range speed sensor failures. The sensed speed at each of these three instances in time is utilized in an excursion formula, preferably implemented by programmable logic, that calculates the total sum of the change in speed between the three instances in time. The excursion formula is defined to be the difference between the sensed speed at the first most recent instance in time and the sensed speed at the second most recent instance in time, with this difference being added to the difference between the sensed speed at the first most recent instance in time and the sensed speed at the current instance in time. The absolute value of this sum is the resulting output of the excursion formula. The calculated total sum of the change in speed is then compared against a predetermined reference value and if the calculated sum exceeds the reference value, an in-range failure of the speed sensor is determined to exist.

15 Claims, 3 Drawing Sheets

METHOD AND APPARATUS FOR DETERMINING AN IN-RANGE FAILURE OF A SPEED SENSOR

TECHNICAL FIELD

This invention relates to speed sensors, and more particularly to a method and an apparatus for determining the occurrence of an in-range failure of a speed sensor.

BACKGROUND ART

Various types of sensors are available that sense the speed of movement of different devices. In particular, sensors exist which sense the rotational speed of various parts of machinery such as motors, generators and gas turbine engines. A common type of rotational speed sensor comprises a magnetic pick-up, fixed in position, which magnetically senses the rotational movement of teeth in proximity to the sensor. The teeth, or similar type of physical protrusions, are an integral part of the rotating component such as an output shaft of a generator. The sensor provides an electrical output signal typically having a plurality of discrete voltage pulses that correlate to the motion of the teeth in proximity to the sensor.

The sensed speed signal is usually signal conditioned to remove noise, and is then input to signal processing circuitry. The circuitry comprises a control system for the machinery, wherein the control system calculates the rotational speed of the machinery from some characteristic of the electrical pulses. For example, the speed may be calculated from the number of pulses occurring in a certain period of time. Also typically utilized in the calculation is the diameter of the rotating component and the number of teeth formed in the rotating component.

The calculated rotational speed is utilized by the signal processing circuitry in providing for dynamic control of the machinery. For example, for a gas turbine engine, the calculated engine speed is used by the control system to vary the amount of fuel provided to the combustor portion of the engine. In turn, the amount of fuel is used to maintain or change the current rotational speed of the engine. Thus, a faulty speed signal can lead to the inaccurate control of the machinery, often with disastrous consequences.

For example, a faulty speed signal associated with a generator can falsely indicate to the control system that the generator is experiencing an acceleration condition. This may lead the control system to incorrectly believe that there is a reduced or "dropped" load on the generator. In response, the control system typically causes the generator to enter a rapid deceleration condition in an attempt to prevent the incorrectly perceived generator overspeed condition. The overspeed is an undesirable and incorrect condition that is attributed by the control system to the machinery. The overspeed condition and subsequent incorrect response are caused by the failure of the speed sensor to provide an accurate signal to the control system.

Due to this requirement of an accurate speed signal, the control circuitry often includes some means for periodically checking the health of the speed sensor, typically by checking the validity of the signal provided by the sensor. There are various known methods for determining the existence of a gross failure of a speed sensor. A "gross" failure typically means a situation where the machinery being monitored is moving or rotating, yet the sensor is providing no signal and, thus, a speed of zero is mistakenly indicated. One known detection method involves the use of a plurality of speed sensors connected in a parallel, redundant manner. In this method, the signals provided by the sensors are all compared to one another. A gross failure of a sensor is determined to exist when the sensor output significantly differs from the output of all other sensors.

Another failure situation is where the machinery is rotating either at a constant speed other than zero or at a changing speed (e.g., an acceleration or deceleration). In this situation, the speed sensor is providing the control system with a signal indicative of some speed value other than zero. However, the speed value indicated by the signal is not accurate. For example, the speed of the generator may be constant, yet the sensor indicates that the generator is accelerating or decelerating, or is at a different constant speed value. This situation is commonly referred to as an "in-range" failure of the speed sensor. In-range failures are generally more difficult to determine than gross failures. An in-range failure may be determined by the control system using the aforementioned comparison method employing a plurality of sensors connected in parallel. However, this method is unavailable when only a single speed sensor is used.

DISCLOSURE OF INVENTION

A primary object of the present invention is to provide a method and an apparatus for determining the occurrence of an in-range failure of a speed sensor when only a single sensor is utilized to sense the speed of a moving device such as a rotating piece of machinery.

Another object of the present invention is to provide a method and an apparatus for determining the occurrence of an in-range failure of a speed sensor wherein the method and apparatus are easily implemented in programmable logic.

The present invention is predicated on the fact that when a speed sensor fails in-range, the sensor typically provides an output signal having one or more minimum and maximum peak values. When viewed graphically, these peak values are sharp in nature in that they are relatively quickly attained and then departed from. Also, the speeds indicated by the peak values are in-range, yet the values for the points before and after these peaks may be different. The difference between these values is referred to as the relative change in point. For example, the speed signal may transition from a higher value down to a first low peak value, then it may transition quickly up to a higher peak value, then it may transition quickly back down to a second low peak value, then back up to a higher value, etc. The signal make take on a relatively high frequency sawtooth or triangular waveform configuration. Also, for this example, the first and second low peak values may be different. In contrast, a speed sensor operating normally may indicate an acceleration from a constant speed value by a relatively smooth (i.e., slow) transition from a low value up to a second higher value and without an immediate corresponding transition back down to a lower speed value (i.e., without a deceleration).

According to the present invention, a method and an apparatus for determining the existence of an in-range failure of a speed sensor involves sensing the speed of a moving device at three consecutive instances in time, wherein the corresponding time intervals between these instances in time are preferably equally spaced, and wherein each time interval is relatively short in duration to thereby correlate in time to the waveform characteristics of most anticipated in-range speed sensor failures. The sensed speed at each of these three instances in time is utilized in an excursion formula, preferably implemented by programmable logic, that calculates the total sum of the change in speed between the three instances in time. The excursion formula is defined to be the difference between the sensed speed at the first most recent instance in time and the sensed speed at the second most recent instance in time, with this difference being added to the difference between the sensed speed at the first most recent instance in time and the sensed speed at the current instance in time. The absolute value of this sum is the resulting output of the excursion formula. The calculated total sum of the change in speed is then compared against a predetermined reference value and if the calculated sum exceeds the reference value, an in-range failure of the speed sensor is determined to exist and corrective action may then be taken. With the passage of time and the attainment of the next instance in time, the excursion formula may then be re-applied to the speed values at the then current instance in time, the then first most recent instance in time, and the then second most recent instance in time. In this way, the excursion formula may repeatedly be applied upon the occurrence of successive time instances to thereby continuously check the health of the speed sensor.

The present invention has utility for use with various types of speed sensors that sense the movement of various types of devices. The movement may be of any type, including linear or rotational. For example, the present invention is particularly useful in conjunction with magnetic pick-up sensors, which sense the rotational speed of a machine such as a motor, a generator or a gas turbine engine. The present invention also has utility in speed sensing schemes employing only a single sensor.

The above and other objects and advantages of the present invention will become more readily apparent when the following description of a best mode embodiment of the present invention is read in conjunction with the accompanying drawings.

BEST MODE FOR CARRYING OUT THE INVENTION

Figure 1:
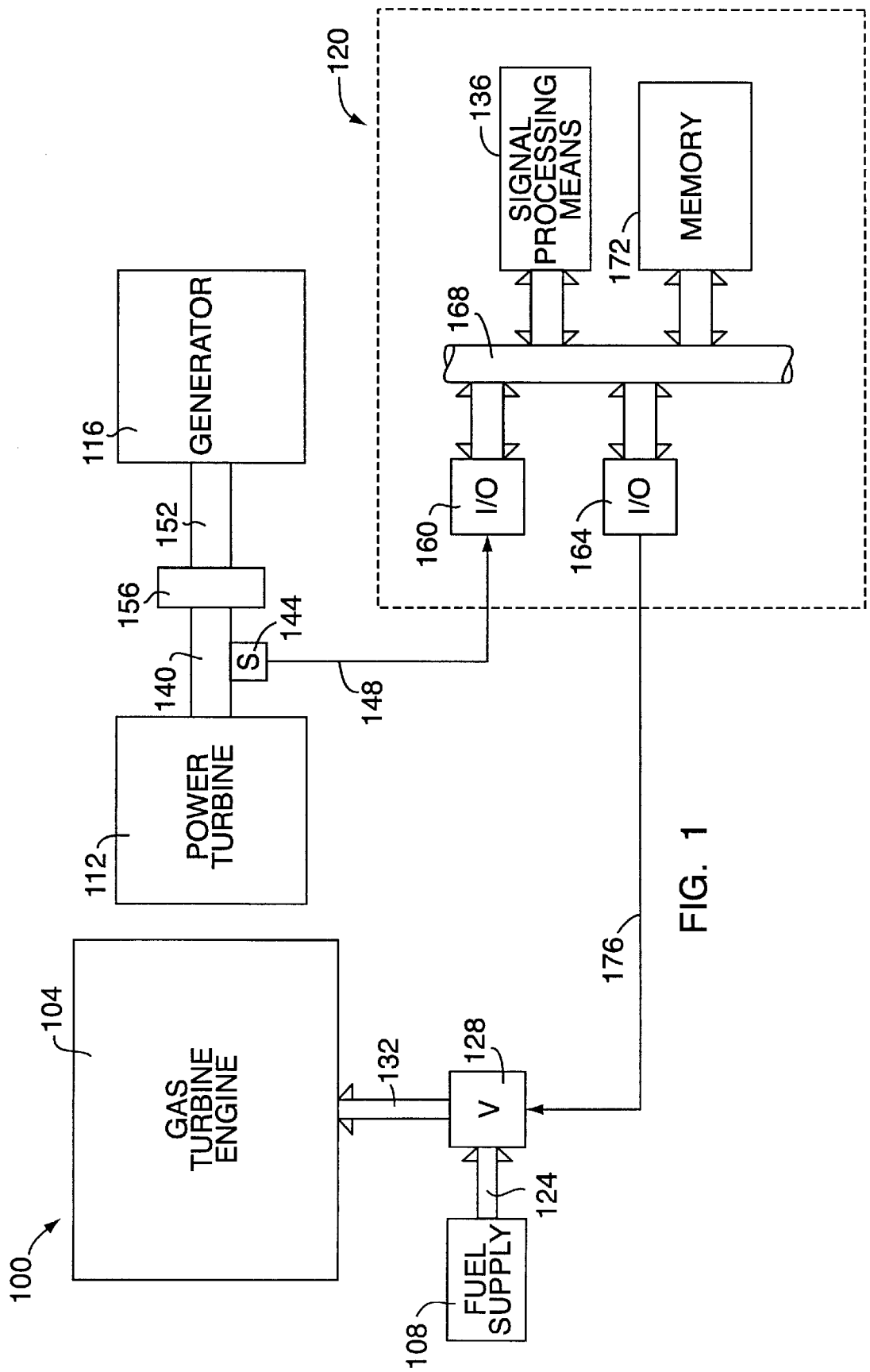
FIG. 1 is a block diagram of a gas turbine power plant including a control system in which the present invention may be implemented.

Referring to FIG. 1, an industrial gas turbine power plant 100 for generating electricity is well known in the art and typically comprises a gas turbine engine 104, a fuel supply 108, a power turbine 112, a generator 116, and an engine control system 120. The gas turbine engine 104 may typically comprise any one of several engines commercially available from United Technologies Corporation, Hartford, Conn., the assignee of the present invention. The details of the gas turbine engine 104 are well known and are described, for example, in U.S. Pat. No. 5,581,995, assigned to the assignee of the present invention and incorporated by reference herein.

Although its detailed components are not illustrated in detail herein, a conventional gas turbine engine 104 of the type normally used in the gas turbine power plant 100 includes a low pressure rotor comprised of a low pressure compressor directly connected by a first shaft to a downstream low pressure turbine. The low-pressure compressor receives air from the engine inlet. The gas turbine engine 104 also has a high-pressure rotor disposed between the low-pressure compressor and the low-pressure turbine. The high-pressure rotor is comprised of a high-pressure compressor directly connected by a second shaft to a downstream high-pressure turbine. The second shaft extends through the first shaft, which is partially hollow.

The gas turbine engine 104 also includes a burner disposed between the high-pressure compressor and the high-pressure turbine. The burner may comprise a plurality of combustors that surround the rotor shafts. The burner receives compressed air from the compressors and fuel from the fuel supply 108 and ignites the fuel/air mixture to create exhaust air that enters the two turbines. The fuel supply 108 provides fuel into a first fuel supply line 124, through a fuel valve 128, and then into a second fuel supply line 132 to the burner. The fuel valve 128, including its associated actuator, are under the control of signal processing means 136 located within the control system 120, as described hereinafter. The fuel valve 128 facilitates the modulation of the fuel supplied to the burner. Although not illustrated in FIG. 1, the two rotors (including their associated compressors, turbines and shafts), as well as the burner (including its associated combustors), are disposed within the gas turbine engine block 104 of the power plant 100.

The gas turbine power plant 100 further includes the power turbine 112 located downstream of the gas turbine engine 104. The power turbine 112 has a rotatable shaft 140. The turbine shaft 140 may have a number of physical protrusions such as teeth (not shown) formed as an integral part of the shaft 140. In an exemplary embodiment of the present invention, the turbine shaft 140 has a speed sensor 144 attached thereto. The speed sensor 144 senses the rotational motion of the physical protrusions on the turbine shaft 140. The speed sensor 144 comprises the means for sensing the rotational speed of the turbine shaft 140 and for providing a signal indicative thereof on a signal line 148 to the control system 120. In a preferred exemplary embodiment, the speed sensor 144 may comprise a magnetic pick-up, commercially available from Electro Corp., and comprising the model Magnetic Sensor, part number 724718.

The gas turbine power plant 100 also has the generator 116 coupled by a rotatable shaft 152 to the power turbine shaft 140 by a conventional coupling 156. The coupling 156 adapts the turbine shaft 140 to fixedly engage the generator shaft 152. Thus, the speed signal on the line 148 is also indicative of the rotational speed of the generator shaft 152.

In the exemplary embodiment of the gas turbine power plant 100 illustrated in FIG. 1, the power turbine 112 is physically disconnected from the gas turbine engine 104. As such, the jet exhaust air exiting the two turbines of the gas turbine engine 104 flows through the power turbine 112, thereby driving the power turbine 112 and producing mechanical energy. The mechanical energy is in the form of the rotation of both the power turbine shaft 140 and the coupled generator shaft 152. The generator 116 converts this mechanical energy into electrical energy in well-known fashion. Alternatively, the gas turbine power plant 100 may be of the direct drive type where there exists no power turbine 112, and, instead, the generator shaft 152 is physically connected directly to the low and/or high-pressure turbines of the gas turbine engine 104. In this alternative embodiment, the speed sensor 144 senses the actual rotational speed of the generator shaft 152.

The gas turbine power plant 100 of FIG. 1 also includes the engine control 120, which, in an exemplary embodiment, preferably comprises various commercially available electronic components. The engine control 120 includes a number of input/output ("I/O") buffers 160, 164, which comprise temporary data storage locations. The speed signal on the line 148 from the speed sensor 144 connects to one of the 1(0 buffers 160. The speed signal I/O buffer 160 is connected to a bus 168, which comprises a plurality of signal lines of various types, including control, address and data signals. The bus 168 facilitates the communication of data between the various components within the control system 120.

The engine control 120 also includes the signal processing means 136 connected to the bus 168. In a preferred embodiment, the signal processing means 136 comprises well known and commercially available programmable logic, such as a microprocessor or a programmable logic array. The aforementioned I/O buffers 160, 164 may comprise a portion of the programmable logic. When programmed accordingly as described in detail hereinafter, the signal processing means 136 comprises means, responsive to the sensed speed of the power turbine 112 or generator 116, for determining an in-range failure of the speed sensor 144. An exemplary embodiment of the method for determining an in-range failure of the speed sensor 144, according to the present invention, is described in more detail hereinafter with respect to the flowchart of FIG. 4.

The engine control 120 also includes memory means 172 for storing various signals associated with the operation of the signal processing means 136, including those signals involved with the method of the present invention. The memory means 172, which is connected to the bus 168, may comprise commercially available readable and/or writable memory, such as ROM, RAM EEPROM or EAROM, or other similar devices. Alternatively, the memory means 172 may be formed integral with the signal processing means 136 within the same integrated circuit ("IC") device. Also, the I/O buffers 160, 164 may comprise a portion of the memory means 172, and may also be formed integral with the signal processing means 136. As such, the bus 168 is also formed integral with the signal processing means 136.

Further, the engine control 120 includes another I/O buffer 164 associated with an output signal on a line 176 that emanates from the engine control 120 and is connected to the fuel valve actuator 128. The signal on the line 176 is utilized to control the fuel valve 128 during modulation of the fuel flow to the burner in accordance with known methods.

In operation of the gas turbine power plant 100 of FIG. 1, inlet air flows through the compressors of the gas turbine engine 104. The resulting compressed air flows to the burner. The fuel supply 108 provides fuel to the burner. The burner ignites the fuel/air mixture in the combustors, causing jet exhaust air to be created at the burner outlet. The jet exhaust air flows downstream and passes through the two turbines, thereby driving the first and second rotor shafts. The rotation of these shafts, in turn, causes the two compressors upstream to rotate. The rotation of the compressors supplies the burner with the necessary inlet air.

After the jet exhaust air passes through the two turbines, the exhaust air flows through the power turbine 112 and out the gas turbine engine 104. The jet exhaust air drives the power turbine 112 by rotating the turbine shaft 140. The generator shaft 152 is also rotated by the power turbine shaft 140 through the coupling 156. The speed sensor 144 senses the rotational speed of the power turbine shaft 140 and, thus, the generator shaft 152 as well, and provides the speed signal on the line 148 to the speed I/O buffer 160 within the engine control 120. The signal processing means 136 receives the sensed speed signal through the data bus 168 and carries out the steps in the flowchart of FIG. 4 in determining any occurrence of an in-range failure of the speed sensor 144, in accordance with the present invention.

As mentioned hereinbefore, the present invention is predicated on the fact that when a speed sensor 144 fails in-range, the sensor 144 typically provides an output signal on the line 148 having minimum and maximum peak values. Referring to the exemplary waveform 180 of FIG. 2 (which illustrates a speed sensor 144 experiencing an in-range failure), the speed signal on the line 148 transitions from a higher speed value down to a first low peak speed value, s0, at time t0; the signal then transitions sharply up to a higher peak speed value, s1, at time t1 (as illustrated by the portion 184 of the waveform 180); the signal then transitions sharply back down to a second low peak speed value, s2, at time t2 (as illustrated by the portion 188 of the waveform 180); the signal then transitions back up to a higher value. The waveform 180 of the speed sensor 144 experiencing an in-range failure typically repeats this sawtooth or triangular pattern periodically over time. Also, the time intervals between the minimum and maximum peak values (i.e., the time intervals between t0 and t1, and between t1 and t2) tend to be constant over time, for example, 10 milliseconds ("msec"). The present invention accounts for and exploits these repetitive and constant features of the signal provided by a speed sensor 144 that has failed in-range.

Figure 2:
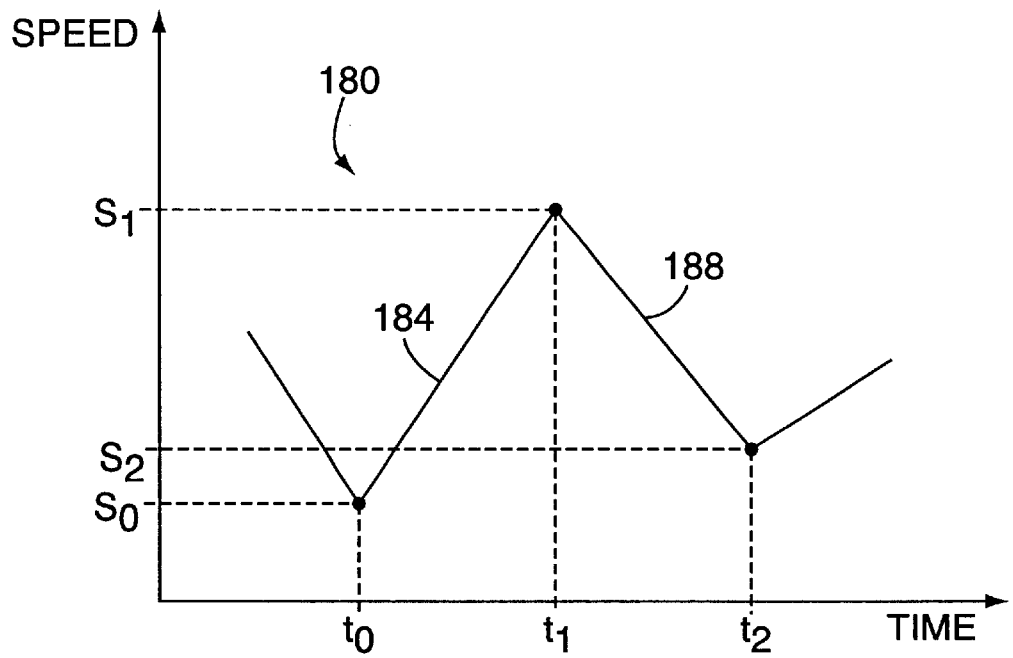
FIG. 2 is a graph of a waveform depicting the changes in speed over time that occur as part of an in-range failure of a speed sensor, the in-range failure being determined by the control system of FIG. 1 having the present invention implemented therein.
Figure 3:
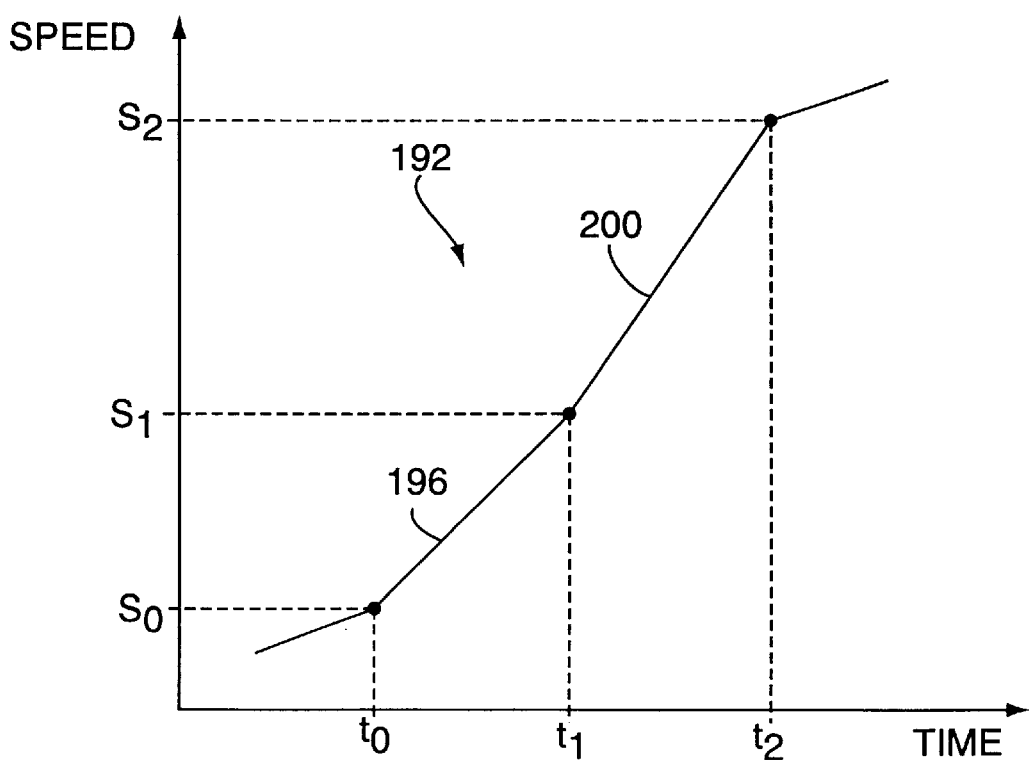
FIG. 3 is a graph of a waveform depicting the changes in speed over time that occur as part of a normal acceleration and which are detected by the speed sensor and determined not to be an in-range failure of the speed sensor by the control system of FIG. 1 having the present invention implemented therein.

In contrast to the waveform of the failed sensor of FIG. 2, a speed sensor 144 operating normally may indicate an acceleration from a constant speed by a relatively smooth (i.e., slow) transition from a low speed value up to a higher value and without an immediate corresponding transition back down to a lower speed value (i.e., without a deceleration). The waveform 192 of FIG. 3 illustrates such a normal acceleration. In the waveform 192 of FIG. 3, the speed signal transitions from a first speed value, s0, at time t0, up to a higher speed value, s1, at time t1 (as illustrated by the portion 196 of the waveform 192); the signal then transitions to an even higher speed value, s2, at time t2 (as illustrated by the portion 200 of the waveform 192).

Thus, as can be seen by a comparison of the waveforms 180, 192 of FIGS. 2 and 3, the waveform 180 of a speed sensor 144 experiencing an in-range failure exhibits a repetitive pattern of alternating high and low peak speed values (FIG. 2). In contrast, the waveform 192 of a speed sensor 144 experiencing a normal acceleration or deceleration typically exhibits a unilateral excursion that is not repetitive over time and which usually takes longer to occur (FIG. 3). Thus, even if the generator 116 experienced a rapid acceleration followed by a rapid deceleration, the resulting waveform likely would not have the same amplitude and time characteristics as does the waveform 180 of FIG. 2. Instead, the peak-to-peak excursions would occur more gradual over time. Therefore, by utilizing relatively short time intervals (e.g., 10 msec) in the calculation of the total sum of the change in speed, the present invention can discriminate most in-range speed sensor failures from various normal, non-failure speed conditions.

Figure 4:
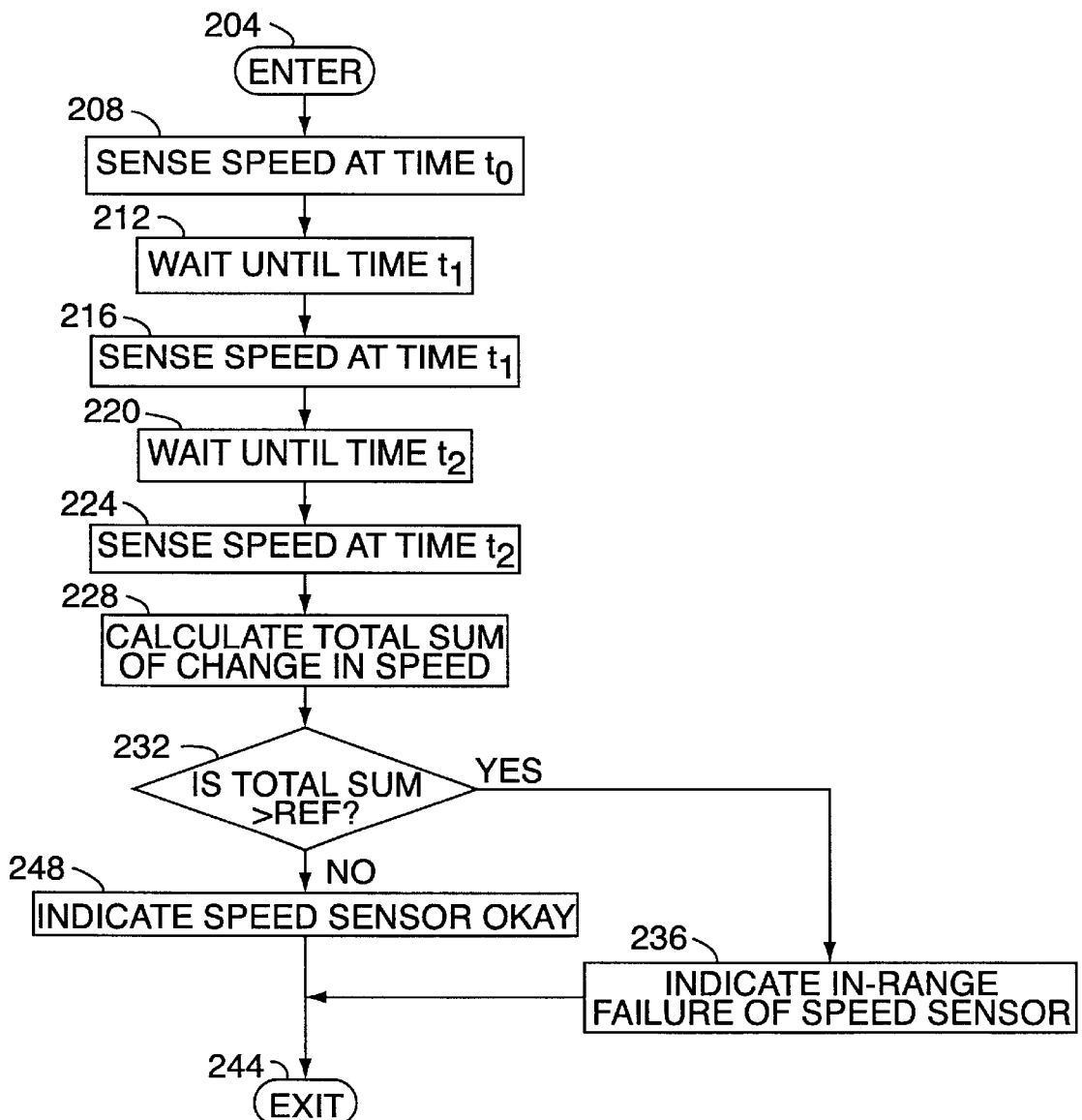
FIG. 4 is a flowchart of the steps carried out by the present invention in determining the occurrence of the in-range failure of the speed sensor as illustrated by the graph of FIG. 2.

Referring to FIG. 4, there illustrated is a flowchart of steps carried out by the signal processing means 136 in determining the existence of an in-range failure of the speed sensor 144 of FIG. 1. In a preferred, exemplary embodiment, the steps of the flowchart of FIG. 4 represent instructions implemented in software, stored in the memory means 172, and executed by the programmable logic comprising the signal processing means 136. The software instructions may comprise a subroutine that is periodically executed at regular intervals of time. As a specific example, reference is also made to the waveform 180 of FIG. 2 and to the block diagram of FIG. 1.

In the flowchart of FIG. 4, after an enter step 204, a step 208 is executed in which the speed sensor 144 senses the speed of the power turbine shaft 140 at the first instance in time, t0, illustrated in FIG. 2. For exemplary purposes, this speed value, s0, equals 3000 revolutions per minute ("rpm"). This sensed speed value may be stored by the signal processing means 136 in the memory means 172 for later processing. The signal processing means 136 then waits in a step 212 until the occurrence of the next instance in time, t1. In a preferred exemplary embodiment, the time interval between t0 and t1 is 10 msec. In the alternative, during this 10 msec waiting interval the signal processing means 136 may execute other instructions, not illustrated in the flowchart of FIG. 4 and not a part of the present invention.

Upon the occurrence of this second instance in time, t1, a step 216 is executed in which the speed of the power turbine shaft 140 is again sensed. This speed value, s1, may also be stored in memory 172 for later processing. For exemplary purposes in explaining a typical in-range failure of the speed sensor 144, this second speed value is 3500 rpm. The signal processing means 136 then waits in a step 220 until the occurrence of the next instance in time, t2. This instance in time preferably occurs 10 msec after the previous instance in time, t1. At time t2, the rotational speed value, s2, of the power turbine shaft 140 is again sensed in a step 224. For exemplary purposes, the value of s2 is 3200 rpm.

The signal processing means 136 then executes two steps 228, 232 in which it determines whether an in-range failure of the speed sensor 144 exists. This determination is made first by a calculation step 228 involving the three sensed speed values, s0, s1 and s2, at the corresponding three instances in time, t0, t1 and t2. As such, s0 is referred to as the speed value at the second most recent time interval, to; s1 is referred to as the speed value at the most recent time interval, t1; and s2 is referred to as the speed value at the current instance in time, t2. This calculation step 228 involves the excursion formula, which quantifies the calculated total sum of the change in speed over the two most recent time intervals defined by the three most recent instances in time: to, t1 and t2. The excursion formula is given by either one of the following two identical equations:

$$\text{change in speed} = |(s1-s0)+(s1-s2)|$$

or, $$\text{change in speed} = |v1+v2|$$

That is, the excursion formula is defined to be the difference between the sensed speed, s1, at the first most recent instance in time, t1, and the sensed speed, s0, at the second most recent instance in time, t0. This difference is represented by v1. Then, this difference is added to the difference between the sensed speed, s1, at the first most recent instance in time, t1, and the sensed speed, s2, at the current instance in time, t2. This difference is represented by v2. The absolute value of this sum is the resulting output of the excursion formula.

As the excursion formula is applied to the exemplary values for s0, s1 and s2, given hereinbefore, the excursion formula calculates the total sum of the change in speed to be equal to 800 rpm. In the flowchart of FIG. 4, the signal processing means 136 then executes the step 232 where it compares the calculated total sum of the change in speed to a reference value. If the calculated sum is greater than the reference value, an in-range failure of the speed sensor 144 is determined to exist. The reference value may be chosen by any method, for example, empirically or analytically. Also, the reference value is chosen to be high enough so as not to be exceeded by the application of the excursion formula to normal noise fluctuations present on the speed sensor signal output on the line 148. For the example of FIG. 2, the reference value is chosen to be equal to 200 rpm. Thus, for the example of the flowchart of FIG. 4 being applied to the exemplary speed values of FIG. 2, an in-range failure of the speed sensor 144 is determined to exist, because the calculated total sum of the change in speed of 800 rpm is greater than the reference value of 200 rpm. Then, according to the flowchart of FIG. 4, the signal processing means 136 executes a step 236 where it indicates the occurrence of the in-range failure of the speed sensor 144. This indication may be made in some audio and/or visual manner. The flowchart then exits in a step 244.

With respect to the normal acceleration waveform 192 of FIG. 3, in an exemplary embodiment, the value of s0 at t0 equals 3000 rpm, the value of s1 at t1 equals 3500 rpm, and the value of s2 at t2 equals 3900 rpm. When the excursion formula is applied to these values, the calculated total sum of the change in speed equals 100 rpm. When this calculated total sum is compared to the exemplary reference value of 200 rpm, an in-range failure of the speed sensor 144 is determined not to exist. This is because the calculated total sum is less than the reference value. As such, the signal processing means 136 executes the step 244 in the flowchart of FIG. 4 wherein it indicates that the speed sensor 144 is healthy. The flowchart then exits in the step 244.

As can be seen from a comparison of the flowchart of FIG. 4 applied to the waveforms 180, 192 of FIGS. 2 and 3, when the speed sensor 144 is healthy during normal steady state or acceleration/deceleration operation of the power turbine 112 and generator 116, the calculated total sum of the change in speed, as provided by the excursion formula, is a relatively small value. This is because the speed sensor waveform inherently does not exhibit relatively sharp minimum and maximum peak values (FIG. 3). As such, the excursion formula always causes the calculated total sum to be a relatively small value. This is true even though the values of v1 and v2 can become relatively large during the acceleration transient. Further, the utilization of relatively short time intervals (e.g., 10 msec) between the sensing of speed helps to insure that the calculated total sum of the change in speed does not exceed the predetermined reference value.

On the other hand, when the speed sensor 144 is experiencing an in-range failure, the excursion formula produces a calculated total sum of the change in speed that is relatively much higher in value. This is inherently due to the sawtooth or triangular waveform, having repetitive sharp minimum and maximum peak values, provided by the speed sensor 144 at its output on the line 148. Also, the sawtooth waveform has relatively constant and short time intervals between minimum and maximum peak values. It are these differences in the physical characteristics of the waveforms of good and in-range failed sensors that are exploited by the method and apparatus of the present invention in determining whether the sensor 144 is okay or is failed.

Although the present invention has been described with respect to the sensed speed at three separate, consecutive instances in time, it should be understood that the present invention can be repetitively executed upon the attainment of successive instances in time. For example, with the passage of time and the attainment of the next instance in time, the excursion formula may then be re-applied to the speed values at the then current instance in time, the then first most recent instance in time, and the then second most recent instance in time. In this way, the excursion formula may repeatedly be applied upon the occurrence of successive time instances to continuously check the health of the speed sensor.

Although the present invention has been described and illustrated herein for use with a specific type of gas turbine engine 104, it should be understood that other types or constructions of gas turbine engines may be utilized herein without departing from the broadest scope of the present invention. For example, the gas turbine engine 104 may have only a single spool, thus having only a single rotor. Essentially, the details of the construction of the gas turbine engine 104 are irrelevant to the broadest scope of the present invention.

Further, the present invention may be utilized on any and all types of rotating machinery, not just on the rotating generator 116 or power turbine 112 described and illustrated herein. For example, the present invention may be utilized with any speed sensor associated with any and all types of rotating shafts, such as those associated with motors or vehicles.

Still further, the best mode of the present invention has been described herein with respect to a rotating piece of machinery. However, the present invention may be utilized with other types of devices that move but do not rotate. That is, a rotating machine is not critical to the broadest scope of the present invention. Instead, the present invention may be utilized with any type of device where a speed sensor is utilized to sense, measure, detect, calculate or determine the non-rotational (e.g., linear) speed of that device, usually from movement of that device. The adaptation of the present invention, as described and illustrated herein, to non-rotating, moving devices should be apparent to one of ordinary skill in the art in light of the teachings herein.

Also, the present invention has been described and illustrated herein as being implemented in a control system 120 having programmable logic (i.e., the signal processing means) comprised of electronic components. However, it should be understood that such an implementation is purely exemplary. Instead, the present invention may be implemented using discrete, non-programmable dedicated analog and/or digital electrical or electronic logic circuitry. Further, although all of the calculations have been described as being carried out by a single signal processing means 136 (e.g., a microprocessor), the calculations may, instead, be carried out individually by different calculating components. This may be especially relevant when the signal processing means 136 is implemented using a number of discrete logic components (e.g., adders, subtractors, multipliers, etc.). Such alternative embodiments should be apparent to one of ordinary skill in the art in light of the teachings herein.

All of the foregoing changes and descriptions are merely exemplary. It suffices for the broadest scope of the present invention that a method and an apparatus for determining the existence of an in-range failure of a speed sensor involves sensing the speed of a moving device at three consecutive instances in time, wherein the time intervals between these instances in time are preferably equally spaced, and wherein each time interval is relatively short in duration to thereby correlate in time to the waveform characteristics of most anticipated in-range speed sensor failures. The sensed speed at each of these three instances in time is utilized in an excursion formula, preferably implemented by programmable logic, that calculates the total sum of the change in speed between the three instances in time. The excursion formula is defined to be the difference between the sensed speed at the first most recent instance in time and the sensed speed at the second most recent instance in time, with this difference being added to the difference between the sensed speed at the first most recent instance in time and the sensed speed at the current instance in time. The absolute value of this sum is the resulting output of the excursion formula. The calculated total sum of the change in speed is then compared against a predetermined reference value and if the calculated sum exceeds the reference value, an in-range failure of the speed sensor is determined to exist and corrective action may then be taken.

Although this invention has been shown and described with respect to the detailed embodiments thereof, it will be understood by those skilled in the art that various changes in the form and detail thereof may be made without departing from the broadest scope of the claimed invention.

Having thus described the invention, what is claimed is:

1. Apparatus for determining an occurrence of a failure condition associated with a speed sensor used to sense the speed of an object, comprising:

memory means for storing at least one signal;

signal processing means, responsive to a plurality of speed signals provided by the speed sensor wherein the plurality of speed signals are all indicative of the speed of the object at a corresponding plurality of predetermined instances in time, for storing selected ones of the plurality of the speed signals in the memory means, the signal processing means further comprising means for calculating a total change in the speed of the object over a time interval consisting of three consecutive ones of the predetermined instances in time, the three consecutive predetermined instances in time comprising a current instance in time, a first most recent instance in time, and a second most recent instance in time, wherein the signal processing means comprises the means for calculating the total sum in a change in the speed of the object over the time interval by calculating any difference between the speed of the object at the first most recent instance in time and the speed of the object at the second most recent instance in time, then creating a sum by adding the calculated difference to any difference between the speed of the object at the first most recent instance in time and the speed of the object at the current instance in time, then calculating the absolute value of the sum, the signal processing means further comprising means for determining the occurrence of the failure condition associated with the speed sensor from the calculated absolute value of the sum.

2. The apparatus of claim 1, wherein the signal processing means further comprises means for determining the occurrence of the failure condition associated with the speed sensor by comparing the calculated absolute value of the sum with a predetermined reference value.

3. The apparatus of claim 2, wherein the signal processing means further comprises means for determining the occurrence of the failure condition associated with the speed sensor when the calculated absolute value of the sum exceeds the predetermined reference value.

4. The apparatus of claim 1, wherein the plurality of predetermined instances in time are equally spaced apart in time.

5. The apparatus of claim 1, wherein the three consecutive instances in time are equally spaced apart in time.

6. Apparatus for determining an occurrence of a failure condition associated with a speed sensor used to sense the speed of an object, comprising:

means, responsive to a plurality of speed signals provided by the speed sensor wherein the plurality of speed signals are all indicative of the speed of the object at a corresponding plurality of predetermined instances in time, for calculating any difference between the speed of the object at a first most recent predetermined instance in time and the speed of the object at a second most recent predetermined instance in time;

means for adding the calculated difference to any difference between the speed of the object at the first most recent predetermined instance in time and the speed of the object at a current predetermined instance in time;

means for calculating the absolute value of the sum; and means for determining the occurrence of the failure condition associated with the speed sensor from the calculated absolute value of the sum.

7. The apparatus of claim 6, wherein the means for determining the occurrence of the failure condition associated with the speed sensor comprises means for comparing the calculated absolute value of the sum with a predetermined reference value.

8. The apparatus of claim 7, wherein the means for determining the occurrence of the failure condition associated with the speed sensor further comprises means for determining the occurrence of the failure condition associated with the speed sensor when the calculated absolute value of the sum exceeds the predetermined reference value.

9. The apparatus of claim 6, wherein the current predetermined instance in time, the first most recent predetermined instance in time, and the second most recent predetermined instance in time are equally spaced apart in time.

10. A method of determining an occurrence of a failure condition associated with a speed sensor used to sense the speed of an object, comprising:

sensing the speed of the object at a plurality of predetermined instances in time;

providing a plurality of sensed speed signals indicative of the sensed speed at the plurality of predetermined instances in time;

calculating a total change in the speed of the object over a time interval consisting of three consecutive ones of the predetermined instances in time, the three consecutive predetermined instances in time comprising a current instance in time, a first most recent instance in time, and a second most recent instance in time, wherein the step of calculating the total change in the speed of the object over the time interval comprises the steps of calculating any difference between the speed of the object at the first most recent instance in time and the speed of the object at the second most recent instance in time, creating a sum by adding the calculated difference to any difference between the speed of the object at the first most recent instance in time and the speed of the object at the current instance in time, and calculating the absolute value of the sum; and determining the occurrence of the failure condition associated with the speed sensor from the calculated absolute value of the sum.

11. The method of claim 10, further comprising the step of storing selected ones of the sensed speed signals.

12. The method of claim 10, wherein the step of determining the occurrence of the failure condition associated with the speed sensor further comprises the step of comparing the calculated absolute value of the sum with a predetermined reference value.

13. The method of claim 12, wherein the step of comparing the calculated absolute value of the sum with a predetermined reference value further comprises the step of determining the occurrence of the failure condition of the speed sensor when the calculated absolute value of the sum exceeds the predetermined reference value.

14. The method of claim 10, wherein the plurality of predetermined instances in time are equally spaced apart in time.

15. The method of claim 10, wherein the three consecutive instances in time are equally spaced apart in time.

* * * * *